United States Patent
Nicolai

(10) Patent No.: US 7,787,624 B2
(45) Date of Patent: Aug. 31, 2010

(54) METHOD FOR INSERTING SYNCHRONIZATION MARKERS INTO A VIDEO STREAM, COMPATIBLE WITH A BLOCK CIPHER

(75) Inventor: Jean Nicolai, Chateauneuf le Rouge (FR)

(73) Assignee: STMicroelectronics SA, Montrouge (FR)

( * ) Notice: Subject to any disclaimer, the term of this patent is extended or adjusted under 35 U.S.C. 154(b) by 1238 days.

(21) Appl. No.: 11/331,579

(22) Filed: Jan. 13, 2006

(65) Prior Publication Data

US 2006/0182275 A1    Aug. 17, 2006

Related U.S. Application Data

(63) Continuation of application No. PCT/FR2004/001791, filed on Jul. 8, 2004.

(30) Foreign Application Priority Data

Jul. 16, 2003  (FR) .................................. 03 08639

(51) Int. Cl.
*H04N 7/167* (2006.01)
*H04K 1/00* (2006.01)

(52) U.S. Cl. ................ 380/200; 380/217; 380/28; 380/29; 380/37

(58) Field of Classification Search ......... 380/200–203, 380/212, 217, 269, 274, 37, 42, 28–29; 713/189; 725/25, 31

See application file for complete search history.

(56) References Cited

U.S. PATENT DOCUMENTS 5,008,935 A * 4/1991 Roberts ..................... 380/29
5,761,302 A * 6/1998 Park .......................... 380/201
6,505,299 B1   1/2003 Zeng et al.

FOREIGN PATENT DOCUMENTS

EP    0 619 677    10/1994

OTHER PUBLICATIONS

Alattar, A., et al., "Evaluation of Selective Encryption Techniques for Secure Transmission of MPEG-Compressed Bit-Streams," in *Proceedings of the 1999 IEEE International Symposium*, Orlando, FL, May 30-Jun. 2, 1999, pp. 340-343.
Shi, C., et al., "A Fast MPEG Video Encryption Algorithm," in *Proceedings of the ACM Multimedia '98*, Bristol, UK, Sep. 12-16, 1998, pp. 81-88.
International Standard, ISO/IEC 14496-2, Information Technology-Coding of audio-visual objects—Part 2: Visual, 2004, 19 pages.

* cited by examiner

*Primary Examiner*—Hosuk Song
(74) *Attorney, Agent, or Firm*—Lisa K. Jorgenson; Timothy L. Boller; Seed IP Law Group PLLC

(57) ABSTRACT

A method inserts synchronization markers into a standardized stream of compressed and ciphered data, wherein at least one part of the compressed data stream is ciphered bit by bit, by block cipher, and wherein a synchronization marker is only inserted into the compressed data stream after the number of ciphered bits has reached or exceeded the number of bits of the cipher block.

18 Claims, 4 Drawing Sheets

METHOD FOR INSERTING SYNCHRONIZATION MARKERS INTO A VIDEO STREAM, COMPATIBLE WITH A BLOCK CIPHER

CROSS REFERENCE TO RELATED APPLICATIONS

The present application is a continuation of and claims priority under 35 U.S.C. §120 from International Application Serial No. PCT/FR2004/001791, filed on Jul. 8, 2004 and designating the United States, which claims priority from French Application Serial No. 03/08369, filed on Jul. 16, 2003, both of which are assigned to the same assignee as the present application and incorporated herein by reference in their entireties.

BACKGROUND OF THE INVENTION

1. Field of the Invention

The present invention relates to a method for processing ciphered data, and to apparatus and media for its implementation.

The technical field of the present invention is the manufacturing of video data encoders.

The present invention relates more particularly to a method for processing audio or video data partially ciphered by a block cipher algorithm, the data being compressed and organized according to a standardized format.

2. Description of the Related Art

Today, the secured distribution of video documents is limited to the broadcasting of "pay-as-you-go" cable or satellite television; the security is provided by "proprietary" cipher systems, which are defined, implemented and controlled by a single provider: the broadcaster.

The new standards of low-rate video, broadband Internet and wireless-network handheld terminals, of 3G telephone or personal assistant type, should soon enable the distribution of video documents: teleconferencing, multimedia messages, film trailers, live sporting events and video on demand, in particular.

Some security specifications are emerging which cannot be met by the current solutions. The specifications are as follows:

a—the syntax of the ciphered stream should remain as compliant as possible with the coding standard, so as to facilitate the transport by network; the method for processing data should provide transparency to the transcoding and to the changes in data rates, as well as transparency to the routers and servers for reasons of confidence; the method should enable random access and other video processing without deciphering the complete stream, and should enable the transport by protocols provided for standard video;

b—the compression efficiency should not be reduced as a result of the securing of the data by ciphering;

c—the securing should be compatible with various tools provided for by the video data compression standards (MPEG4, H264), particularly the resistance to errors, for wireless transmission and the losses of IP (Internet protocol) packets, as well as the multi-level coding, for heterogeneous bandwidth client terminals;

d—the security and backward masking level should be adapted to the application: robustness to video-specific attacks;

e—the required computing power should remain compatible with embedded terminals, for applications such as the wireless streaming of multimedia documents.

According to the MPEG standard, a video sequence is made up of a series of groups of images, each image group comprising a series of images of type I (intrinsic), P (predicted) and B (bi-directional); each type-I image is split into macroblocks; each macroblock is converted into four luminance blocks and into two chrominance blocks, this conversion resulting in a first loss of information.

Each 64-pixel block is converted into a 64-coefficient table by a DCT ("discrete cosine transform"); this table is compressed by quantization and then ordered and coded ("zig-zag ordering" and "run-length coding") according to the number of zero-value coefficients encountered during a zig-zag scan of the table; the resulting compressed data are coded into words of variable length ("Huffman coding"); these transformations also result in a loss of information.

Various methods for ciphering a standardized video data stream—particularly an MPEG-standard stream—have been proposed in order to meet some of the aforementioned requirements.

The document "A Fast MPEG Video Encryption Algorithm", Changgui Shi et al., ACM Multimedia 98, describes a method for ciphering MPEG-compressed video data, by a secret key; the sign bits of the Huffman coefficients (AC and DC)—which are codewords of variable length—are combined bit by bit with XOR gates with a key of determined length, and are respectively replaced—in the video data stream—with the bit value resulting from this operation; this document proposes using one or more long key(s); a 128-bit key is used as an example.

This selective cipher method, which operates on a small part of the data stream, requires fewer computing resources than those required by the methods for fully ciphering the stream; on the other hand, the darkening of the ciphered images is relatively low.

U.S. Pat. No. 6,505,299-B1 (Zeng et al.) describes alternatives of this method, and proposes ciphering the motion vectors of the P and B-type images; this increases the darkening of the ciphered images.

According to the aforementioned document Changgui Shi et al., sync points, which are added to the data stream, enable a decoder that has the key to know which position in the ciphered stream it must start using the deciphering key from again; these sync points are added at the beginning of each image group, at the beginning of each type-I image or at the beginning of a predetermined number of images.

According to schedule E to the ISO standard 14496-2, in a "video packet resynchronization" mode, a periodic synchronization marker can be created at the end of a macroblock when the number of bits since the previous marker is higher than a certain threshold; a video packet (part of the stream between two successive markers) thus has a variable number of macroblocks.

When the data stream is partially ciphered with a block cipher algorithm, such as the DES (64-bit block) and a fortiori AES (128 bits) standards, the number of data bits to be ciphered inside this video packet can be lower than the number of bits of the cipher block, particularly when the packet contains the motion vectors associated with the P and B-type images; in this case, this packet will be transmitted without ciphering, and the darkening of the sequence will be reduced.

BRIEF SUMMARY OF THE INVENTION

An embodiment of the present invention is directed to an improved method for inserting synchronization markers into a standardized stream of compressed and ciphered data.

The method overcomes—at least in part—the disadvantages of the known methods for ciphering compressed audio and video data streams.

Another embodiment of the present invention is directed to an encoder or decoder (hardware and/or software) enabling the method to be implemented.

According to a first embodiment of the present invention, a method inserts synchronization markers into a standardized stream of compressed and ciphered data, wherein at least one part of the stream of compressed data is ciphered bit by bit, by block cipher, and a synchronization marker is only inserted into the stream of compressed data after the number of ciphered bits has reached or exceeded the number of bits of the cipher block.

According to another embodiment of the present invention, a method inserts synchronization markers into a stream of MPEG-compressed and ciphered video data, in which:

only one part of the compressed data is ciphered bit by bit, with an algorithm for ciphering by block of a predetermined number of bits, the bits to be ciphered in the compressed data stream are put into a buffer the dimension of which is equal to said predetermined number and a synchronization marker is inserted into the compressed data stream after the buffer has been filled.

According to another embodiment of the present invention, a computer-readable medium, on which a program code is saved that implements the operations defined above, enables the computer to broadcast a stream of data compressed and ciphered in accordance with the present invention.

According to another embodiment of the present invention, a compressed stream of ciphered data is obtained indirectly by a method according to the present invention.

The present invention applies in particular to methods using a 64-bit, 128-bit, 192-bit, or 256-bit block cipher algorithm to cipher one or more bit(s)—the sign bit for example—of the motion vector and/or texture data of I, P and B-type images according to the MPEG4 standard.

Another embodiment of the present invention is directed to an encoder or decoder of formatted and compressed audio or video data, which comprises:

a buffer provided for temporarily receiving the selected data bits with a view to their ciphering, block cipher means capable of ciphering the bits stored in the buffer, means for activating the block cipher means, to cause the ciphering of the bits stored in the buffer when the buffer is full, to replace the selected bits in the data stream with the bits stored and ciphered, and to empty the buffer, the size of the buffer being equal to the number of bits of a block of the block cipher means.

Alternatively, the size of the buffer is equal to a whole multiple of the number of bits of a block of the block cipher means, which enables the security to be increased by chaining several blocks.

One embodiment of the present invention avoids a data packet situated between two consecutive synchronization markers of the data stream being transmitted without ciphering.

BRIEF DESCRIPTION OF THE SEVERAL VIEWS OF THE DRAWINGS

Other features and advantages of the present invention appear in the following description, which refers to the appended drawings, and which shows, without limitation, preferred embodiments and examples of embodiments of the present invention.

DETAILED DESCRIPTION OF THE INVENTION

Figure 1:
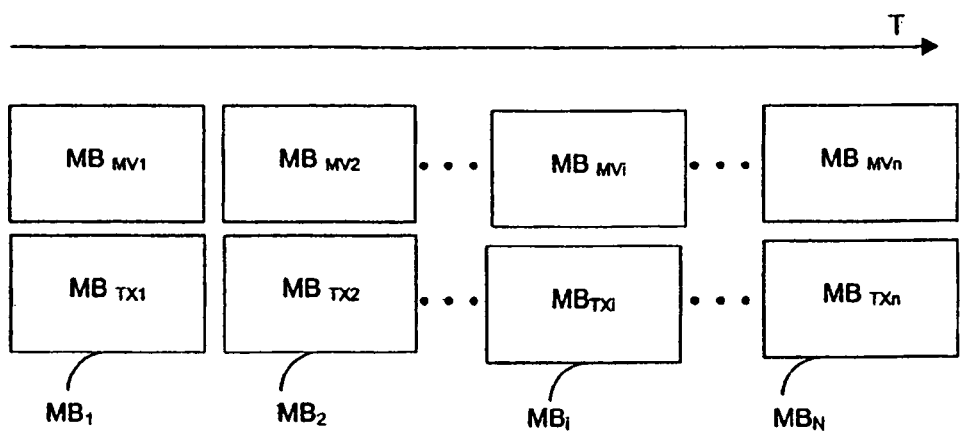
FIG. 1 shows one part of a data stream to be processed according to the present invention, which is in the form of a series of n macroblocks, each macroblock comprising motion vector data and texture data.
Figure 2:
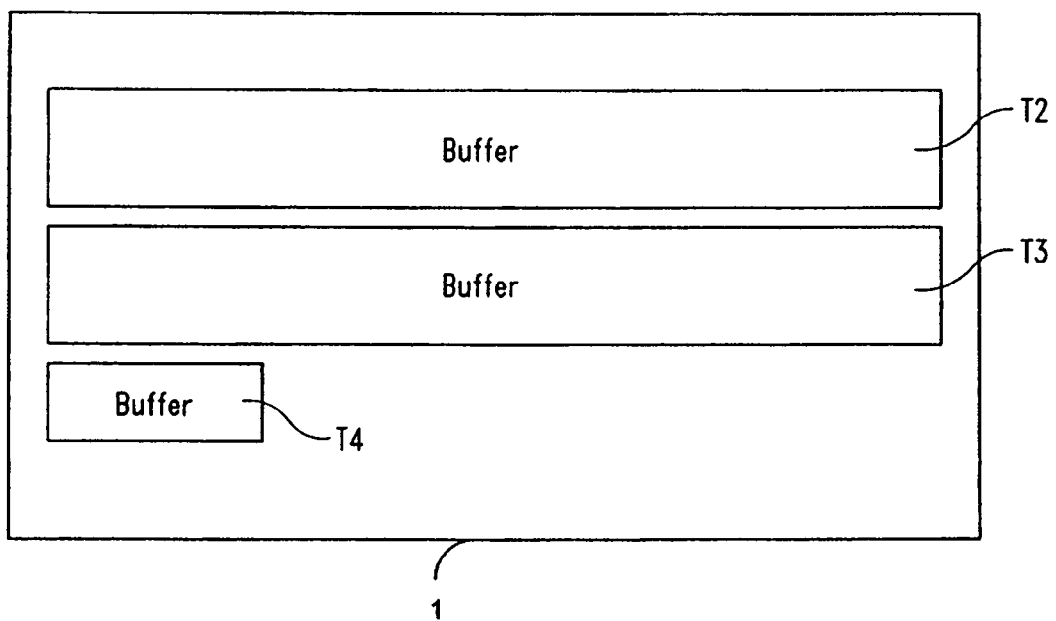
FIG. 2 schematically represents a useful system for implementing the present invention.

According to one preferred embodiment, the proposed method involves generating a synchronization marker if the number of bits since the last marker is higher than a certain threshold (Cf. MPEG4 ISO standard 14496-2 schedule E), such as 2048 bits for example, and if the number of bits ciphered since the last marker is at least equal to the size of the block of the block cipher algorithm chosen, for example at least equal to 128 if the algorithm chosen is the AES, or 64 if the algorithm chosen is the DES. This avoids video packets being transmitted in plain text because they are too small in size.

It is generally necessary to check the two conditions independently since the number of bits ciphered since the last marker is not equal to the total number of bits since the last marker; indeed, the ciphering is generally selective and not standardized. Generally speaking, the elements of the header are not ciphered, i.e.: the index of the first macroblock, the quantization factor, the HEC (header extension code), which are syntax elements and not content. Furthermore, the useful data, made up of motion vectors and the texture, are not always fully ciphered: for example, only the sign bits of the symbols are ciphered. As the symbols themselves are of variable length, while the sign bit is of fixed length, there is no simple relation between the total number of bits and the number of ciphered bits.

Example 1: after a synchronization marker, another synchronization marker is generated after the next macroblock as soon as the two following conditions are met:

the total number of bits since the last synchronization marker is higher than 2048, and the total number of sign bits of motion vectors and of texture coefficients DCT is higher than 128;

This enables the first 128 sign bits to be ciphered in one AES block, the following bits being ciphered by blocks of 128, and the final bits that are lower in number than 128 remaining in plain text.

Example 2 (in which the "video packet resynchronization" and "data partitioning" modes are used simultaneously):

The "data partitioning" mode separates the useful motion data (motion vectors) from the useful texture data (DCT coefficients) by a motion mark called "motion marker". It is more important to cipher the motion vectors (their sign bits for example), than the texture data, since if plain-text motion vectors are available it is possible to restore the image without the texture. Now, the motion vectors are coded in many fewer bits than the texture, and they often represent fewer than 128 bits in total; the risk therefore exists of broadcasting packets the "motion" part of which is totally in plain text.

The proposed method involves not inserting any new synchronization marker while the ciphered part of the motion vectors (full symbol or sign bits only) does not reach the quantity of 64 or 128 bits, or the block dimension of the cipher algorithm chosen, even if the maximum number of bits of the "synchronization" mode has been reached.

EXAMPLE 3

In this example corresponding to FIGS. 1 to 4, only all or part of the data bits corresponding to the motion vectors are to be ciphered.

The portion of stream shown in FIG. 1 consists of an ordered time series of macroblocks MB1, MB2, . . . MBi, . . . MBn; each macroblock such as MBi comprises motion vector data marked $MB_{MVi}$, and texture data marked $MB_{TXi}$; the motion data can be zero when the macroblock is coded without motion; the texture data can also be zero when the coefficients AC and DC are below the quantization threshold.

Packets said to be "self-synchronous" are packets that can be deciphered and decompressed without using data from other packets.

To create "self-synchronous" packets of a length not much greater than a threshold N equal to 1024 bits and in which the bits to be ciphered are ciphered with the AES block cipher algorithm, for which the dimension of the cipher blocks is 128 bits, a data processing system 1 is used (refer to FIG. 2) comprising three buffers marked T2 to T4; the buffers T2 and T3 each have a dimension of 2048 bits and are respectively provided for temporarily receiving the data $MB_{MVi}$ for T2, the data $MB_{TXi}$ for T3; the buffer T4 of 128 bits is provided for receiving the bits extracted from these data with a view to their ciphering.

The processing of the macroblocks MB1, MB2, . . . MBi, . . . MBn is performed as follows (refer to FIGS. 3 and 4):

before processing the 1$^{st}$ macroblock MB1, a synchronization marker (200) and a header (210) are inserted (steps 100a and 100b);

an index i is set to 1 to indicate the first macroblock MB1 (step 105, the index i can be an explicit index that points to the first macroblock or the step 105 can be an implicit step that simply indicates that the first macroblock is being processed);

then, for the macroblock MB1 and the following macroblocks:

a) the motion data—such as $MB_{MVi}$ for the macroblock MBi—are concatenated (step 110) in the buffer T2, b) the bits to be ciphered are extracted (step 120) from these data and these bits are concatenated in the buffer T4, c) the texture data—such as $MB_{TXi}$ for the macroblock MBi—are concatenated (step 130) in the buffer T3, d) the buffer T4 is checked (test 140) to see if it is full; in the negative, the index i is incremented (step 150) and the operations a) to d) are repeated for the following macroblock;

e) if the result of test 140 is affirmative, the bits selected and put into T4 are ciphered, put back one by one into the buffer T2 at the position they occupied before they were ciphered, and the buffer T4 is emptied (step 160);

f) then a check (test 170) is performed to see whether the sum of the total number (x) of bits put into the buffer T2 and the total number (y) of bits put into the buffer T3 exceeds the threshold N; in the negative, the index i is incremented (step 150) and the operations a) to d) are repeated for the following macroblock;

g) if the result of test 170 is affirmative, the selectively ciphered motion data (220) contained in the buffer T2, a motion marker (230) separating the motion data from the texture data, then the texture data $MB_{TXi}$ contained in the buffer T3 are successively placed (step 190) behind the header (210); the buffers T2 and T3 are emptied, and the previous operations starting from step (100) are repeated as necessary for the following macroblocks.

The data obtained (FIG. 4) thus comprise a series of self-synchronous packets, which are framed by two synchronization markers (200); alternatively, the texture data can be ciphered, preferably selectively too.

Figure 3:
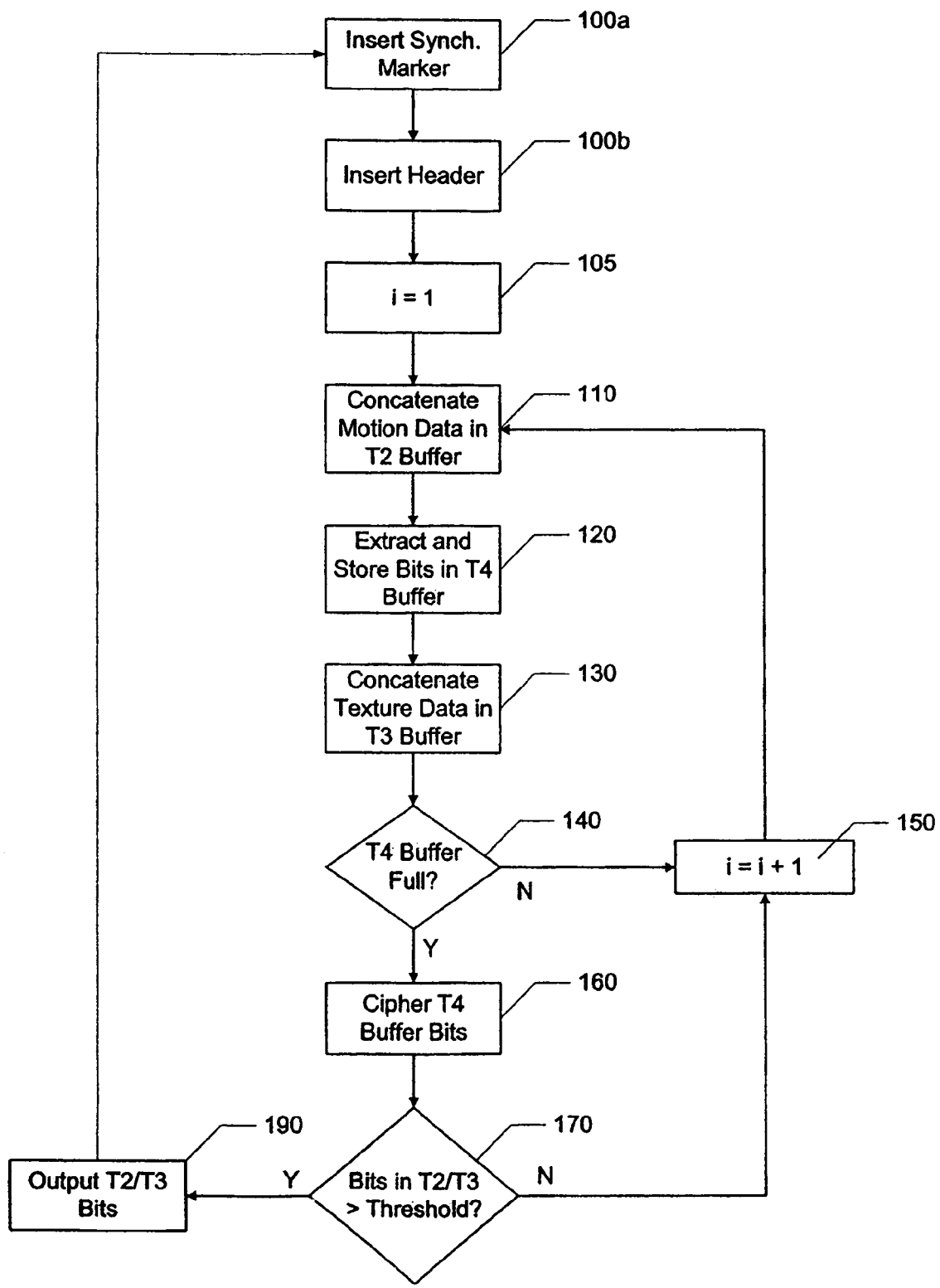
FIG. 3 is a simplified flow chart of a procedure for inserting synchronization markers conforming to the present invention.
Figure 4:
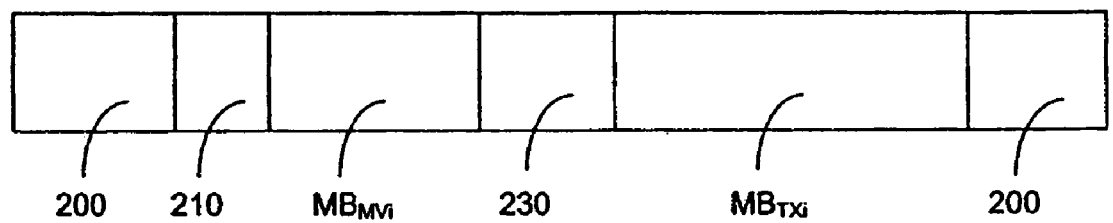
FIG. 4 schematically shows the structure of a part of the data stream obtained according to the present invention from the stream shown in FIG. 1.

It will be noted that, according to the flow chart in FIG. 3, a synchronization marker is inserted after a whole number of ciphered blocks, by performing the test "x+y>$N_{threshold}$" only when the filling of a cipher buffer T4 is finished. An alternative involves performing this test at each macroblock, after at least one buffer T4 has been filled and ciphered; this will result in a whole number of blocks being ciphered, while leaving the final bits that do not reach the threshold of 128 in plain text.

Figure 5:
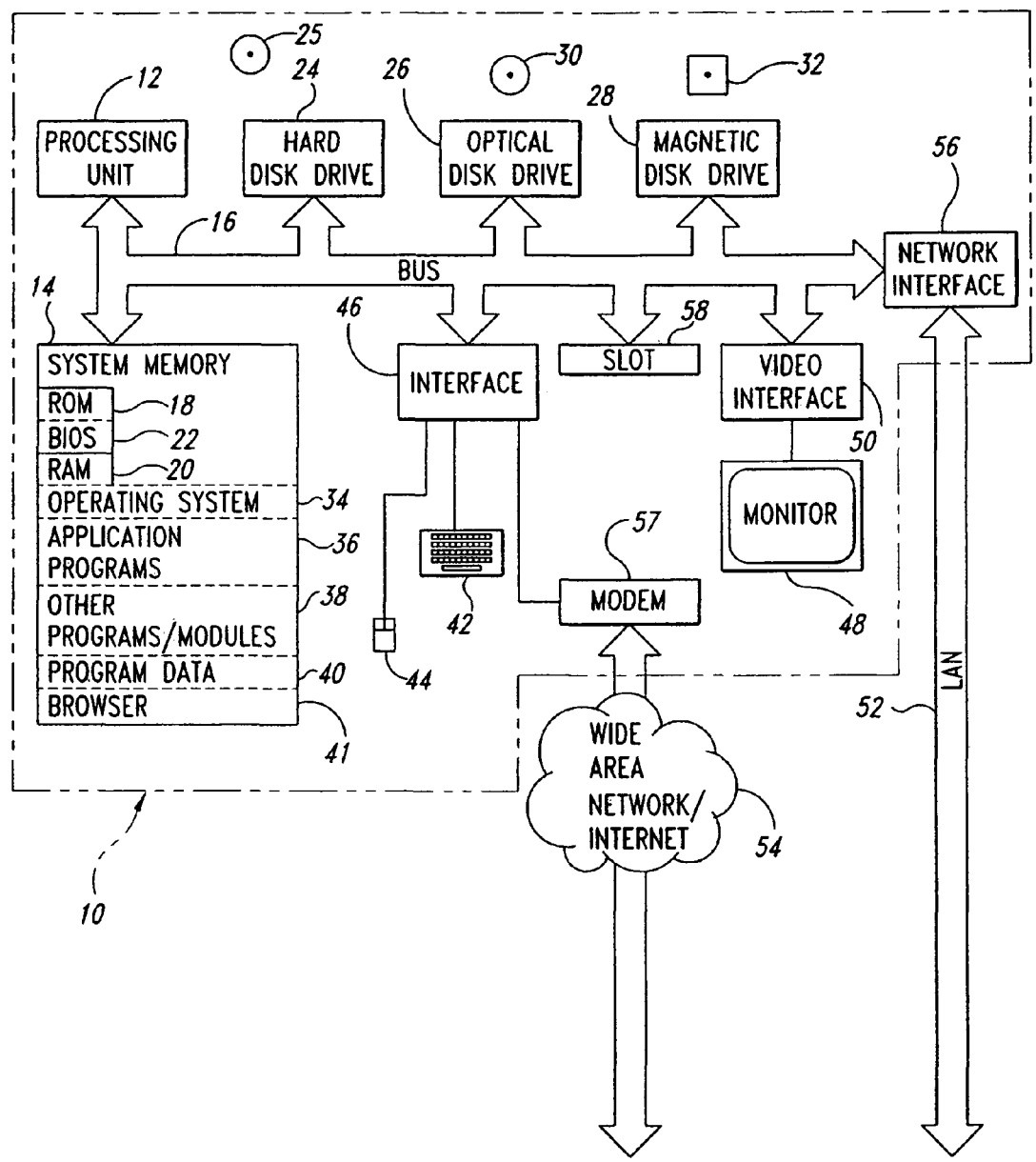
FIG. 5 is a computer system for implementing one embodiment of the present invention.

Those skilled in the art will recognize that the method described above may be implemented in a general purpose computer system. FIG. 5 and the following discussion provide a brief, general description of a suitable computing environment in which the invention may be implemented. Although not required, at least one embodiment of the invention can be implemented in the general context of computer-executable instructions, such as program application modules, objects, or macros being executed by a personal computer. Those skilled in the relevant art will appreciate that the invention can be practiced with other computing system configurations, including handheld devices, multiprocessor systems, microprocessor-based or programmable consumer electronics, network PCs, minicomputers, mainframe computers, and the like. The invention can be practiced in distributed computing environments where tasks or modules are performed by remote processing devices, which are linked through a communications network. In a distributed computing environment, program modules may be located in both local and remote memory storage devices.

Referring to FIG. 5, a personal computer referred to herein as a computing system 10 includes a processor unit 12, a system memory 14 and a system bus 16 that couples various system components including the system memory 14 to the processing unit 12. The processing unit 12 may be any logical processing unit, such as one or more central processing units (CPUs), digital signal processors (DSPs), application-specific integrated circuits (ASIC), etc. Unless described otherwise, the construction and operation of the various blocks shown in FIG. 5 are of conventional design. As a result, such blocks need not be described in further detail herein, as they will be understood by those skilled in the relevant art.

The system bus 16 can employ any known bus structures or architectures, including a memory bus with memory controller, a peripheral bus, and/or a local bus. The system memory 14 includes read-only memory ("ROM") 18 and random access memory ("RAM") 20. A basic input/output system ("BIOS") 22, which can form part of the ROM 18, contains basic routines that help transfer information between elements within the computing system 10, such as during startup.

The computing system 10 also includes one or more spinning media memories such as a hard disk drive 24 for reading from and writing to a hard disk 25, and an optical disk drive 26 and a magnetic disk drive 28 for reading from and writing to removable optical disks 30 and magnetic disks 32, respectively. The optical disk 30 can be a CD-ROM, while the magnetic disk 32 can be a magnetic floppy disk or diskette. The hard disk drive 24, optical disk drive 26 and magnetic disk drive 28 communicate with the processing unit 12 via the bus 16. The hard disk drive 24, optical disk drive 26 and magnetic disk drive 28 may include interfaces or controllers coupled between such drives and the bus 16, as is known by those skilled in the relevant art, for example via an IDE (i.e., Integrated Drive Electronics) interface. The drives 24, 26 and 28, and their associated computer-readable media, provide nonvolatile storage of computer-readable instructions, data structures, program modules and other data for the computing system 10. Although the depicted computing system 10 employs hard disk 25, optical disk 30 and magnetic disk 32, those skilled in the relevant art will appreciate that other types of spinning media memory computer-readable media may be employed, such as, digital video disks ("DVD"), Bernoulli cartridges, etc. Those skilled in the relevant art will also appreciate that other types of computer-readable media that can store data accessible by a computer may be employed, for example, non-spinning media memories such as magnetic cassettes, flash memory cards, RAMs, ROMs, smart cards, etc.

Program modules can be stored in the system memory 14, such as an operating system 34, one or more application programs 36, other programs or modules 38, and program data 40. The system memory 14 also includes a browser 41 for permitting the computing system 10 to access and exchange data with sources such as websites of the Internet, corporate intranets, or other networks, as well as other server applications on server computers. The browser 41 is markup language based, such as hypertext markup language ("HTML"), and operate with markup languages that use syntactically delimited characters added to the data of a document to represent the structure of the document.

While shown in FIG. 5 as being stored in the system memory, the operating system 34, application programs 36, other program modules 38, program data 40 and browser 41 can be stored on the hard disk 25 of the hard disk drive 24, the optical disk 30 and the optical disk drive 26 and/or the magnetic disk 32 of the magnetic disk drive 28. A user can enter commands and information to the computing system 10 through input devices such as a keyboard 42 and a pointing device such as a mouse 44. Other input devices can include a microphone, joystick, game pad, scanner, etc. These and other input devices are connected to the processing unit 12 through an interface 46 such as a serial port interface that couples to the bus 16, although other interfaces such as a parallel port, a game port or a universal serial bus ("USB") can be used. A monitor 48 or other display devices may be coupled to the bus 16 via video interface 50, such as a video adapter. The computing system 10 can include other output devices such as speakers, printers, etc.

The computing system 10 can operate in a networked environment using logical connections to one or more remote computers. The computing system 10 may employ any known means of communications, such as through a local area network ("LAN") 52 or a wide area network ("WAN") or the Internet 54. Such networking environments are well known in enterprise-wide computer networks, intranets, and the Internet.

When used in a LAN networking environment, the computing system 10 is connected to the LAN 52 through an adapter or network interface 56 (communicatively linked to the bus 16). When used in a WAN networking environment, the computing system 10 often includes a modem 57 or other device for establishing communications over the WAN/Internet 54. The modem 57 is shown in FIG. 1 as communicatively linked between the interface 46 and the WAN/Internet 54. In a networked environment, program modules, application programs, or data, or portions thereof, can be stored in a server computer (not shown). Those skilled in the relevant art will readily recognize that the network connections shown in FIG. 5 are only some examples of establishing communication links between computers, and other links may be used, including wireless links.

The computing system 10 may include one or more interfaces such as slot 58 to allow the addition of devices either internally or externally to the computing system 10. For example, suitable interfaces may include ISA (i.e., Industry Standard Architecture), IDE, PCI (i.e., Personal Computer Interface) and/or AGP (i.e., Advance Graphics Processor) slot connectors for option cards, serial and/or parallel ports, USB ports (i.e., Universal Serial Bus), audio input/output (i.e., I/O) and MIDI/joystick connectors, and/or slots for memory.

The term "computer-readable medium" as used herein refers to any medium that participates in providing instructions to processor unit 12 for execution. Such a medium may take many forms, including but not limited to, non-volatile media, volatile media, and transmission media. Non-volatile media includes, for example, hard, optical or magnetic disks 25, 30, 32, respectively. Volatile media includes dynamic memory, such as system memory 14. Transmission media includes coaxial cables, copper wire and fiber optics, including the wires that comprise system bus 16. Transmission media can also take the form of acoustic or light waves, such as those generated during radio wave and infrared data communications.

Common forms of computer-readable media include, for example, a floppy disk, a flexible disk, hard disk, magnetic tape, or any other magnetic medium, a CD-ROM, any other optical medium, punch cards, paper tape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor unit 12 for execution. For example, the instructions may initially be carried on a magnetic disk of a remote computer. The remote computer can load the instructions into its dynamic memory and send the instructions over a telephone line using a modem. The modem 57 local to computer system 10 can receive the data on the telephone line and use an infrared transmitter to convert the data to an infrared signal. An infrared detector coupled to the system bus 16 can receive the data carried in the infrared signal and place the data on system bus 16. The system bus 16 carries the data to system memory 14, from which processor unit 12 retrieves and executes the instructions. The instructions received by system memory 14 may optionally be stored on storage device either before or after execution by processor unit 12.

All of the above U.S. patents, U.S. patent application publications, U.S. patent applications, foreign patents, foreign patent applications and non-patent publications referred to in this specification and/or listed in the Application Data Sheet, are incorporated herein by reference, in their entirety.

From the foregoing it will be appreciated that, although specific embodiments of the invention have been described herein for purposes of illustration, various modifications may be made without deviating from the spirit and scope of the invention. Accordingly, the invention is not limited except as by the appended claims.

The invention claimed is:

1. A method, comprising:
   inserting synchronization markers into a standardized stream of compressed MPEG format video data using at least one processor by:
   ciphering only part of the stream of compressed data bit by bit, by block cipher using a cipher block having a number of bits, thereby producing a number of ciphered bits; and
   inserting a synchronization marker into the stream of compressed data only after the number of ciphered bits has reached or exceeded the number of bits of the cipher block, wherein bits to be ciphered in the compressed data stream are put into a first buffer having a dimension that is equal to the number of bits of the cipher block and a synchronization marker is inserted into the compressed data stream after the buffer has been filled.

2. The method according to claim 1, further comprising:
   a) inserting a synchronization marker and a header in the compressed data stream before processing a first macroblock of the data stream;
   then, for the first macroblock and following macroblocks:
   b) concatenating motion data in a second buffer;
   c) extracting the bits to be ciphered from the motion data and concatenating the extracted bits in the first buffer;
   d) concatenating texture data in a third buffer;
   e) checking the first buffer to see if it is full; if not, repeating the operations b) to e) for a following macroblock;
   f) if the first buffer is full, ciphering the bits in the first buffer, putting the ciphered bits back one by one into the second buffer at the position they occupied before they were ciphered, and emptying the first buffer;
   g) performing a check to see whether a sum of the total number of bits put into the second buffer and the total number of bits put into the third buffer exceeds a threshold; if not, then the operations a) to d) are repeated for a following macroblock;
   h) if the threshold is exceeded, then successively placing the selectively ciphered motion data contained in the second buffer, a motion marker separating the motion data from the texture data, and the texture data behind the header; emptying the second and third buffers; and repeating operations a) to h) as necessary.

3. The method according to claim 1 wherein a 64-bit, 128-bit, 192-bit, or 256-bit block cipher algorithm is used.

4. The method according to claim 1 wherein one or more bits of data of P and B type image motion vectors are ciphered.

5. The method according to claim 1 wherein only one bit of data of P and B type image motion vectors is ciphered.

6. The method according to claim 1 wherein one or more bits of I, P and/or B type image texture data are ciphered.

7. The method according to claim 1 wherein only one bit of I, P and/or B type image texture data ($MB_{TXi}$) is ciphered.

8. A method, comprising:
   inserting synchronization markers into a standardized stream of compressed data using at least one processor, by:
   ciphering at least one part of the stream of compressed data bit by bit, by block cipher using a cipher block having a number of bits, thereby producing a number of ciphered bits;
   counting a total number of bits of the data stream since a previous synchronization marker; and
   inserting a new synchronization marker only:
   after the number of ciphered bits has reached or exceeded the number of bits of the cipher block; and
   after the total number of bits counted has reached or exceeded a threshold, said threshold being higher than the number of bits of the cipher block.

9. A decoder of formatted and compressed audio or video data, comprising:
   at least one processor;
   a first buffer provided for temporarily receiving selected data bits of a data stream; and
   a second buffer that receives and stores a plurality of bits of the data stream, wherein the at least one processor is configured to implement:
   block decipher means for ciphering the bits stored in the first buffer;
   means for extracting the selected data bits from the second buffer and concatenating the selected data bits in the first buffer; and
   means for activating the block decipher means to cause the block decipher means to decipher the bits stored in the first buffer when the first buffer is full, for replacing the selected data bits in the data stream with the deciphered bits, and for emptying the first buffer, the first buffer having a size equal to a number of bits of a block of the block decipher means, or equal to a whole multiple of this number.

10. An encoder of formatted and compressed audio or video data, comprising:
    at least one processor;
    a first buffer provided for temporarily receiving selected data bits of a data stream; and
    a second buffer that receives and stores a plurality of bits of the data stream, wherein the at least one processor is configured to implement:
    block cipher means for ciphering the bits stored in the first buffer;
    means for extracting the selected data bits from the second buffer and concatenating the selected data bits in the first buffer; and
    means for activating the block cipher means to cause of the block decipher means to decipher the bits stored in the first buffer when the first buffer is full, for replacing the selected data bits in the data stream with the ciphered bits, and for emptying the first buffer,
    the first buffer having a size equal to a number of bits of a block of the block cipher means, or equal to a whole multiple of this number.

11. A computer-readable medium on which a program code is saved that causes a computer to broadcast a compressed data stream according to a method comprising:
    ciphering at least one part of the stream of compressed data bit by bit, by block cipher using a cipher block having a number of bits, thereby producing a number of ciphered bits;
    counting a total number of bits of the data stream since a previous synchronization marker; and
    inserting a new synchronization marker into the stream of compressed data only:
    after the number of ciphered bits has reached or exceeded the number of bits of the cipher block; and
    the total number of bits counted has reached or exceeded a threshold, the threshold being higher than the number of bits of the cipher block.

12. The computer-readable medium according to claim 11 wherein one or more bits of data of P and B type image motion vectors are ciphered.

13. The computer-readable medium according to claim 11 wherein one or more bits of I, P and/or B type image texture data are ciphered.

14. A computer-readable medium on which program code is saved that causes a processor to perform a method, the method comprising:

ciphering one part of a stream of compressed MPEG format video data bit by bit, using a cipher block having a number of bits, thereby producing a number of ciphered bits; and inserting a synchronization marker into the stream of compressed data only after the number of ciphered bits has reached or exceeded the number of bits of the cipher block, wherein bits to be ciphered in the compressed data stream are put into a first buffer having a dimension that is equal to the number of bits of the cipher block and a synchronization marker is inserted into the compressed data stream after the buffer has been filled.

15. The computer-readable medium according to claim 14, wherein the method further comprises:

a) inserting a synchronization marker and a header in the compressed data stream before processing a first macroblock of the data stream;

then, for the first macroblock and following macroblocks:

b) concatenating motion data in a second buffer;

c) extracting the bits to be ciphered from the motion data and concatenating the extracted bits in the first buffer;

d) concatenating texture data in a third buffer;

e) checking the first buffer to see if it is full; if not, repeating the operations b) to e) for a following macroblock;

f) if the first buffer is full, ciphering the bits in the first buffer, putting the ciphered bits back one by one into the second buffer at the position they occupied before they were ciphered, and emptying the first buffer;

g) performing a check to see whether a sum of the total number of bits put into the second buffer and the total number of bits put into the third buffer exceeds a threshold; if not, then the operations a) to d) are repeated for a following macroblock;

h) if the threshold is exceeded, then successively placing the selectively ciphered motion data contained in the second buffer, a motion marker separating the motion data from the texture data, and the texture data behind the header; emptying the second and third buffers; and repeating operations a) to h) as necessary.

16. The method of claim 8 wherein the data are MPEG-format video data and wherein:

only part of the compressed data is ciphered bit by bit; and bits to be ciphered in the compressed data stream are put into a first buffer having a dimension that is equal to the number of bits of the cipher block and a synchronization marker is inserted into the compressed data stream after the buffer has been filled.

17. A system, comprising:

at least one processor; and a memory, wherein the at least one processor is configured to insert synchronization markers into a standardized stream of compressed data by:

ciphering at least one part of the stream of compressed data bit by bit, by block cipher having a number of bits, thereby producing a number of ciphered bits;

counting a total number of bits of the data stream since a previous synchronization marker; and inserting a new synchronization marker only after:

the number of ciphered bits has reached or exceeded the number of bits of the cipher block; and the total number of bits counted has reached or exceeded a threshold higher than the number of bits of the block cipher.

18. The system of claim 17 wherein:

only part of the compressed data is ciphered bit by bit; and bits to be ciphered in the compressed data stream are put into a first buffer of the memory having a dimension that is equal to the number of bits of the block cipher and a synchronization marker is inserted into the compressed data stream after the buffer has been filled.

* * * * *